(12) United States Patent
Ireland et al.

(10) Patent No.: US 7,220,935 B2
(45) Date of Patent: May 22, 2007

(54) WELDING TORCH AND SHIELD

(75) Inventors: Mark C Ireland, Colchester (GB); Daniel Clark, Derby (GB); Jeffrey Allen, Derby (GB); Barry D Smith, Hathern (GB); Alexander Kutscherawy, Derby (GB)

(73) Assignee: Rolls-Royce PLC, London (GB)

( * ) Notice: Subject to any disclaimer, the term of this patent is extended or adjusted under 35 U.S.C. 154(b) by 121 days.

(21) Appl. No.: 11/036,363

(22) Filed: Jan. 18, 2005

(65) Prior Publication Data
US 2005/0173379 A1    Aug. 11, 2005

(30) Foreign Application Priority Data
Feb. 11, 2004    (GB)    ................... 0402951.8

(51) Int. Cl.
   B23K 9/00    (2006.01)
(52) U.S. Cl. ..................... 219/74; 219/136; 219/72
(58) Field of Classification Search ............. 219/72, 219/74, 75, 136
   See application file for complete search history.

(56) References Cited

U.S. PATENT DOCUMENTS

| 1,749,765 | A | * | 3/1930 | Hendrickson | ................ 219/74 |
| 4,035,602 | A | * | 7/1977 | Berghof | ........................ 219/72 |
| 4,039,798 | A | * | 8/1977 | Lythall et al. | ................ 219/72 |
| 4,651,500 | A | * | 3/1987 | Chaffey | ........................ 53/204 |
| 5,352,860 | A | * | 10/1994 | Richardson | ............. 219/117.1 |
| 5,361,972 | A | * | 11/1994 | Barker | ........................ 228/219 |
| 5,484,973 | A | * | 1/1996 | Gittens et al. | ................ 219/74 |
| 5,674,417 | A | * | 10/1997 | Schaugaard et al. | .... 219/137 R |
| 5,950,904 | A | | 9/1999 | Camy et al. | |
| 6,506,995 | B1 | | 1/2003 | Fusaro, Jr. et al. | |

FOREIGN PATENT DOCUMENTS

| GB | 2 308 562 A | 7/1997 |
| GB | 2 394 685 A | 5/2004 |

* cited by examiner

Primary Examiner—Len Tran
(74) Attorney, Agent, or Firm—Oliff & Berridge PLC

(57) ABSTRACT

A welding torch (10) for welding on a component has an electrode (12) within a nozzle (14) through which a flow of gas passes. A shield (20) defines an enclosure (22) around the nozzle (14). Means are provided for supplying weld filler material (18) into the vicinity of the electrode (12) through the shield (20). One end of the shield (20) is attached to the welding torch (10). The other end of the shield (20) is open and extends towards the component (16). An inflatable seal (28) is mounted on the end of the shield (20) to seal between the shield (20) and the component (16).

16 Claims, 1 Drawing Sheet

WELDING TORCH AND SHIELD

Figure 1:
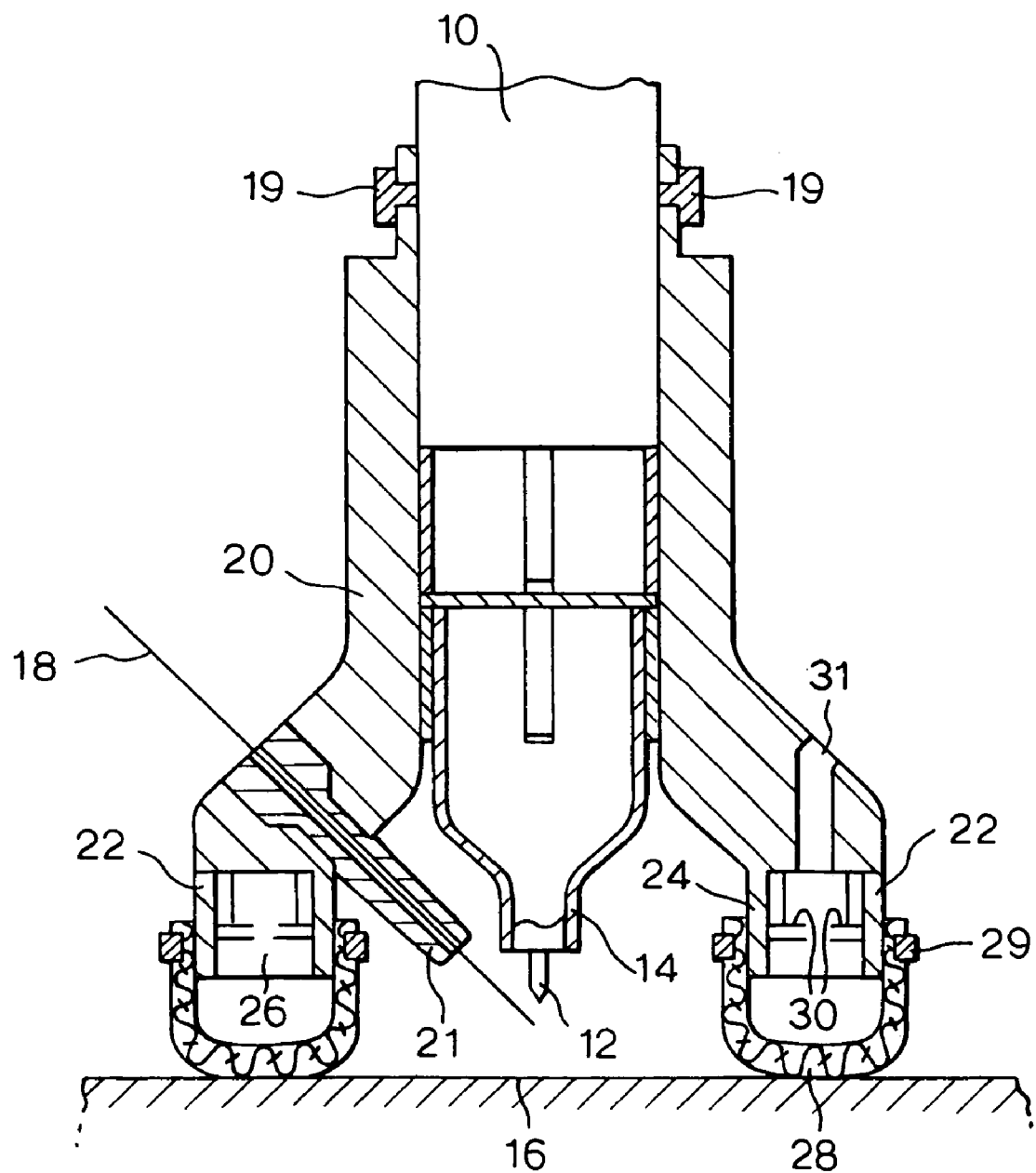

The present invention relates to a welding torch and in particular to a shield suitable for use on a welding torch.

It is known to produce metal work pieces by the deposition of a weld material onto a base plate. The weld material may be deposited by a laser, a metal inert gas welding process (MIG) or a tungsten inert gas welding process (TIG).

In both the MIG and TIG processes a welding torch is provided adjacent a base plate on which the work piece is to be produced. An electrode is provided within the weld torch such that when an electric current is passed therethrough an arc is formed between the weld torch electrode and the base plate. The arc generates sufficient heat for welding to take place.

In the MIG process the electrode melts and forms the weld pool in the surface of the work piece. However in TIG welding the arc melts the material of the base plate and a consumable wire is fed into the weld pool to form the work piece.

In a process known as shaped metal deposition (SMD) a robotically controlled welding torch is used to build structures in layers using wire as a raw material. A key material used in the process of SMD is titanium, which has a high strength to weight ratio.

A problem with the weld deposition of materials such as titanium is that oxygen and nitrogen can diffuse into the material, causing embrittlement and surface discolouration. To prevent this the deposition process is carried out in an inert atmosphere. Chambers, filled with an inert gas such as argon, are commonly used however such chambers are expensive and have high running costs due to the large amounts of inert gas required.

To avoid the use of expensive inert gas chambers it is known to provide a localised flow of shielding gas through the welding torch. The gas passes through a nozzle, which is provided around the electrode of the welding torch. The nozzle directs this small flow of gas to the molten weld pool. The gas shields the molten pool from the atmosphere to prevent oxidation.

Whilst the flow of gas through the nozzle of the welding torch gives protection to the weld pool, the heat-affected zone around the weld pool will oxidise. Additional shielding of the heat-affected zone is therefore required.

The present invention seeks to provide a welding torch having a shield, which provides localised shielding of the molten weld pool and the heat-affected zone.

According to the present invention a welding torch for welding a component comprises a welding element, a nozzle surrounding the welding element through which a first flow of fluid passes, means for supplying weld filler material to the welding element and a shield surrounding the nozzle which defines an enclosure around the nozzle to which a second flow of fluid passes, the shield having an inflatable seal mounted thereon to seal between the shield and the component.

The flow of fluid through the nozzle protects the molten weld pool and the shield prevents oxidation of the heat-affected zone around the weld pool. When inflated the seal on the shield has increased rigidity whilst retaining sufficient flexibility to follow the contours of the component so preventing air being drawn into the heat-affected zone.

In the preferred embodiment of the present invention the shield has a passageway therein through which a flow of fluid, such as an inert gas, passes to inflate the seal. Preferably the passageway is defined by two flanges to which the seal is attached and extends around the entire periphery of the shield. The passageway may contain a diffuser and the inflatable seal is made from porous material, such as ceramic cloth, which acts to further diffuse the fluid supplied thereto.

Preferably means for supplying the weld filler material passes through the shield and is directed to the welding element. In the preferred embodiment of the present invention the welding element is an electrode, however it may be a laser.

According to a further aspect of the present invention a shield for a welding torch comprises a wall member which defines an enclosure, the wall member having an opening at either end, the opening at one end of the wall member being adapted for attachment to the welding torch, the opening at the other end of the wall member having an inflatable seal mounted around the periphery thereof.

In the preferred embodiment the inflatable seal is mounted on flanges provided on the end of the wall member. The flanges define a passageway through which a flow of fluid, such as inert gas, passes to inflate the seal.

The present invention will now be described with reference to FIG. 1 which is a part sectional view of a welding torch having a shield in accordance with the present invention.

Referring to FIG. 1 a tungsten inert gas (TIG) welding torch 10 has a tungsten electrode 12 mounted within a ceramic nozzle 14. A shield 20 is fastened to the welding torch 10 by screws 19. The shield 20 defines an enclosure around the nozzle 14. The shield 20 has two annular flanges 22 and 24, which define an annular passageway 26 therebetween. A ring of inflatable material 28 is attached to the flanges 22 and 24. The ring of inflatable material 28 is attached to the flanges 22 and 24 by circlips 29.

In operation an arc is struck between the electrode 12 and a substrate 16. The arc heats and melts the substrate 16 into which is fed a wire 18 of filler material. The wire 18 of filler material passes through the shield 20. Guide means 21 are provided to direct the wire 18 into the weld pool. In the preferred embodiment of the present invention the filler wire 18 is titanium.

The electrode 12 is tungsten and does not melt as welding takes place. Inert gas is supplied to the torch 10 and flows out of the nozzle 14 to control the weld arc and also to shield the molten weld pool from the atmosphere to prevent oxidisation. Prior to exiting from the nozzle 14 the shielding gas passes through a diffuser (not shown). The diffuser gives a laminar flow so that the arc is not blown out. The shielding gas used is argon however a mixture of argon and helium gives a hotter arc and a deeper penetration. The gas flow to this primary shield is of the order of 15–25 litres/minute, however it will be appreciated that the exact flow will depend on the particular application.

The primary shielding gas from the nozzle 14 of the welding torch 10 cannot cover the heat-affected zone when depositing titanium onto a thick substrate. The shield 20 therefore provides secondary shielding of the entire heat-affected zone.

A second flow of shielding gas is supplied to the annular passageway 26 defined by the two annular flanges 22 and 24 on the shield 20. The secondary flow of shielding gas is supplied to the passageway 26 through three inlets 31 equi-spaced around the shield 20. The gas passing through the inlets 31 is diffused by stainless steel meshes 30 into the material ring 28. The material ring 28 is porous but offers sufficient resistance to the gas flow there through that the ring 28 inflates. The inflated ring 28 protects the inner weld area from turbulence and also prevents air being drawn into the outer heat-affected zone.

Once inflated the material ring 28 is under tension and has increased rigidity whilst also maintaining its flexibility. The inflated ring 28 is able to follow the contours of substrate and helps to maintain the pressure within the inner weld area. The inflated ring 28 offers the further advantage that the material acts as an extra diffuser for the secondary flow of shielding gas. This reduces turbulence and prevents any instability in the weld arc.

In the preferred embodiment of the present invention the ring 28 is made from silica fibres woven into a fabric, known as Dalfratex™. Silica fabrics offer the advantage that they can operate at temperatures in the range of 1000–1600° C., for limited periods. It will however be appreciated that the temperature of the heat-affected zone varies depending on the type of material being welded, the thickness of the material and the diameter of the shield 20. Different materials may therefore be used for the ring 28 provided that the material chosen can withstand the temperatures in the heat-affected zone for a particular application.

Whilst the present invention has been described with reference to a TIG welding torch, it will be appreciated that a shield in accordance with the present invention could be used on a MIG welding torch or in a torch where the welding element is a laser.

We claim:

1. A welding torch for welding a component comprising:
   a welding element;
   a nozzle surrounding the welding element through which a first flow of fluid passes;
   means for supplying weld filler material to the welding element; and
   a shield surrounding the nozzle which defines an enclosure around the nozzle to which a second flow of fluid passes, the shield having an inflatable seal mounted thereon to seal between the shield and the component, wherein
   the inflatable seal is made from a porous material and acts to diffuse the fluid supplied thereto.

2. A welding torch as claimed in claim 1 in which the shield has a passageway therein through which the second flow of fluid passes to inflate the seal.

3. A welding torch as claimed in claim 1 in which a passageway through which the second flow of fluid passes to inflate the seal extends around the entire periphery of the shield.

4. A welding torch as claimed in claim 1 in which a passageway through which the second flow of fluid passes to inflate the seal is defined between two flanges on the shield and the seal is attached thereto.

5. A welding torch as claimed in claim 1 in which a passageway through which the second flow of fluid passes to inflate the seal contains a diffuser.

6. A welding torch as claimed in claim 1 in which the porous material is a fabric made from silica fibers.

7. A welding torch as claimed in claim 1 in which the welding element is an electrode.

8. A welding torch as claimed in claim 1 in which the means for supplying the weld filler material passes through the shield.

9. A welding torch as claimed in claim 1 in which the first and second fluids are an inert gas.

10. A shield for a welding torch comprising:
    a wall member which defines an enclosure, the wall member having an opening at either end, the opening at one end of the wall member being adapted for attachment to the welding torch, the opening at the other end of the wall member having an inflatable seal mounted around the periphery thereof, wherein
    the inflatable seal is made from a porous material and acts to diffuse fluid supplied thereto.

11. A shield as claimed in claim 10 in which the inflatable seal is mounted on flanges provided on the end of the wall member.

12. A shield as claimed in claim 10 in which the inflatable seal is mounted on flanges provided on the end of the wall member, the flanges define a passageway through which a flow of fluid passes to inflate the seal.

13. A shield as claimed in claim 10 in which the fluid is an inert gas.

14. A shield as claimed in claim 12 in which a diffuser is provided in the passageway.

15. A shield as claimed in claim 10 in which the porous material is a fabric made from silica fibers.

16. A shield as claimed in claim 10 further comprising means for supplying a weld filler material to a welding element of the welding torch, the means passes through the wall member.

* * * * *